United States Patent [19]

Leeper et al.

[11] Patent Number: 4,598,619

[45] Date of Patent: Jul. 8, 1986

[54] CUTTER AND EJECTOR FOR USE IN MANUFACTURE OF LICORICE BITES

[75] Inventors: Lloyd C. Leeper, Harrisburg; C. Thomas Mullen, Hummelstown, both of Pa.

[73] Assignee: Hershey Foods Corporation, Hershey, Pa.

[21] Appl. No.: 723,094

[22] Filed: Apr. 15, 1985

[51] Int. Cl.$^4$ .............................. B26D 1/62; B26D 7/18
[52] U.S. Cl. ............................................. 83/117; 83/346
[58] Field of Search ................................. 83/115–117, 83/346, 347

[56] References Cited

U.S. PATENT DOCUMENTS

| | | | |
|---|---|---|---|
| 1,007,721 | 11/1911 | Meyer | 83/116 |
| 2,496,468 | 2/1950 | Hanson | 83/116 |
| 3,217,575 | 11/1965 | Anetsberger | 83/115 |
| 3,747,453 | 7/1973 | Aquarius | 83/117 |
| 4,063,479 | 12/1977 | Roncato | 83/117 |

Primary Examiner—Frank T. Yost
Attorney, Agent, or Firm—Paul & Paul

[57] ABSTRACT

In licorice manufacturing equipment, a cylindrical multibladed cutter assembly for cutting licorice strips into bite length has its blades radially positioned in a cylindrical roller and its cutting edges transverse to the direction of movement of a conveyor carrying extruded licorice strips. For the purpose of preventing the severed bites of licorice from becoming wedged between the adjacent cutting blades, ejector rods are provided, one between each pair of cutting blades. Camming means cam the ejector rods radially outwardly at the circumferential position at which cutting takes place, thereby to dislodge and eject the licorice bites from the cutter.

9 Claims, 6 Drawing Figures

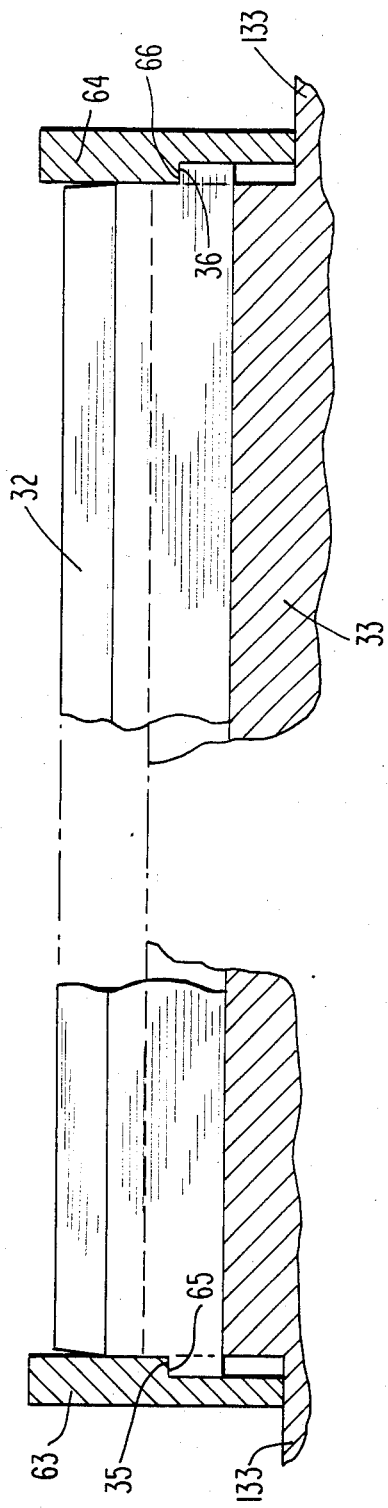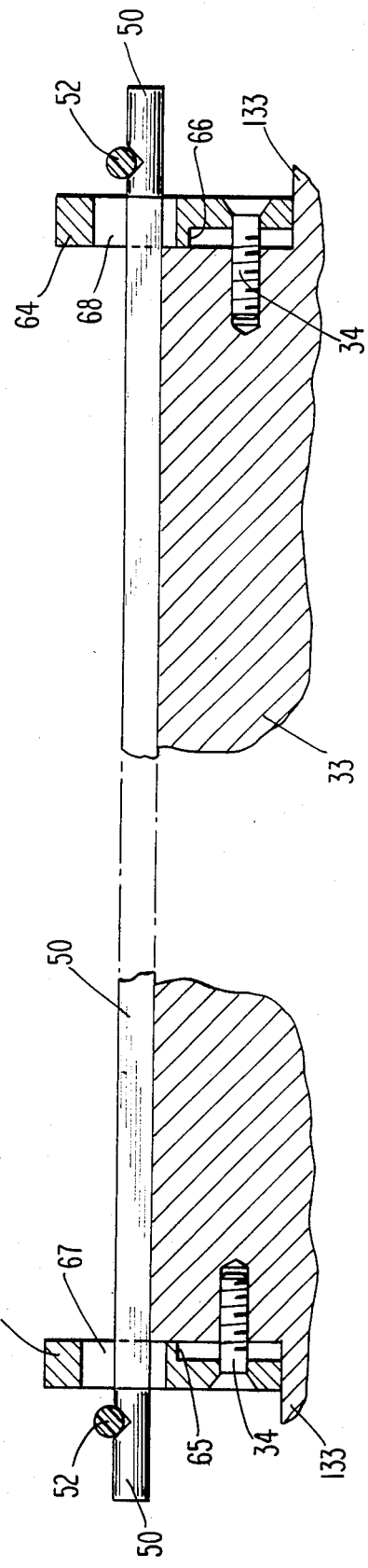

CUTTER AND EJECTOR FOR USE IN MANUFACTURE OF LICORICE BITES

BACKGROUND OF THE INVENTION

This invention relates to the commercial manufacture of licorice. In commercial production, licorice is extruded in the form of strips about 0.575 inches wide and in lengths, for example, of the order of 54 inches. The licorice is then cut to shorter lengths for sale to the consumer. In some cases the licorice is cut, for example, to 9-inch lengths. In other cases, it is cut into "bites" of 1-inch lengths. The present invention is particularly directed to the production of licorice bites.

Licorice is formed by extruding a mixture of flour, sugar, flavoring and water, and perhaps other ingredients. The flavoring may, for example, be arise, or strawberry, or other suitable flavor. Due largely to the presence of sugar in the licorice mix, the extruded licorice strips tend to be tacky and sticky. As a result, it is difficult to cut a group of 54-inch strips of licorice into 1-inch bites by a multi-blade rotary cutter having cutting edges transverse to the elongated licorice strips since the licorice tends to become lodged in the space between adjacent knives.

SUMMARY OF THE INVENTION

A principal object of the present invention is to provide a multi-blade rotary cutter which accomplishes severing of the extruded licorice strips into bites without having the licorice lodge in the space between adjacent knives.

The above object is accomplished, in accordance with the present invention, by providing the multi-blade cutter with ejector rods, one ejector rod being provided in each space between adjacent knives.

BRIEF DESCRIPTION OF THE DRAWING

FIG. 5 is a view looking along the line 5—5 of FIG. 3 showing how the knife blades are retained in the cutter roller.

FIG. 6 is a view looking along the line 6—6 of FIG. 4 showing how the ejector rods are mounted relative to the cutter roller.

DETAILED DESCRIPTION OF THE PREFERRED EMBODIMENTS

Figure 1:
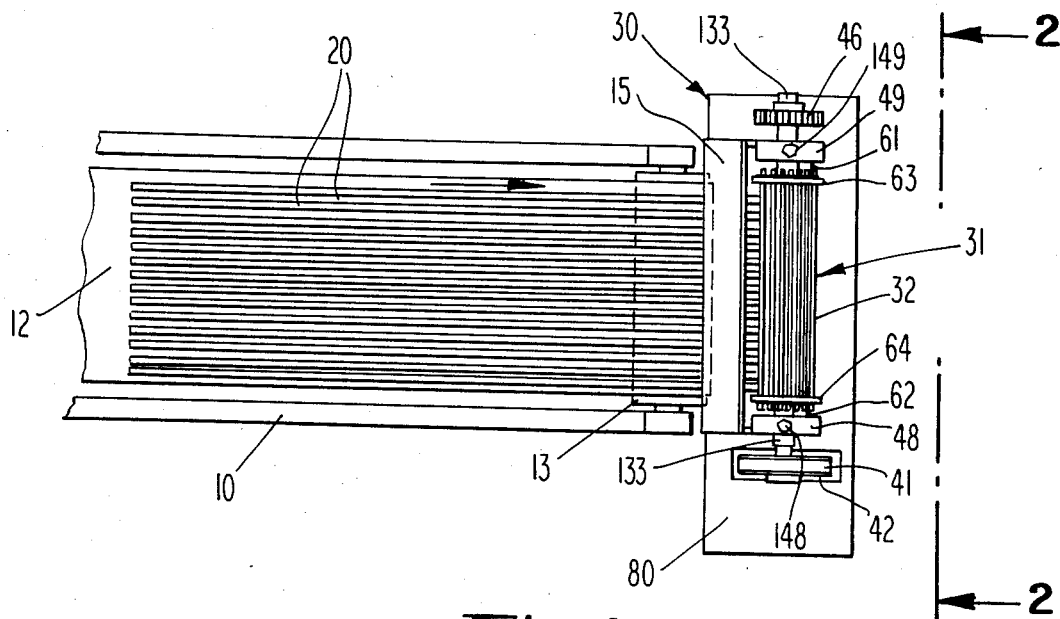
FIG. 1 is a plan view illustrating extruded licorice strips of considerable length, such as 54-inches, being transported to a cutting station at which a multi-bladed rotary cutter is positioned with its knife blades transverse to the direction of movement of the licorice strips.

Referring now to FIG. 1, there is shown a table 10 which supports an endless belt conveyor 12 driven by a drive roller 13. Conveyor 12 is shown to be transporting a group of 15 or 16 substantially parallel strips of licorice each 54 inches long to a cutting station 30 at which is positioned a multi-bladed rotary cutter 31 in which each of the radial cutting blades or knives 32 has its cutting edge positioned transverse to the direction in which the licorice strips are moving. A guard 15 is preferably provided to prevent a finger or hand of an operator from reaching into the knife area.

Figure 2:
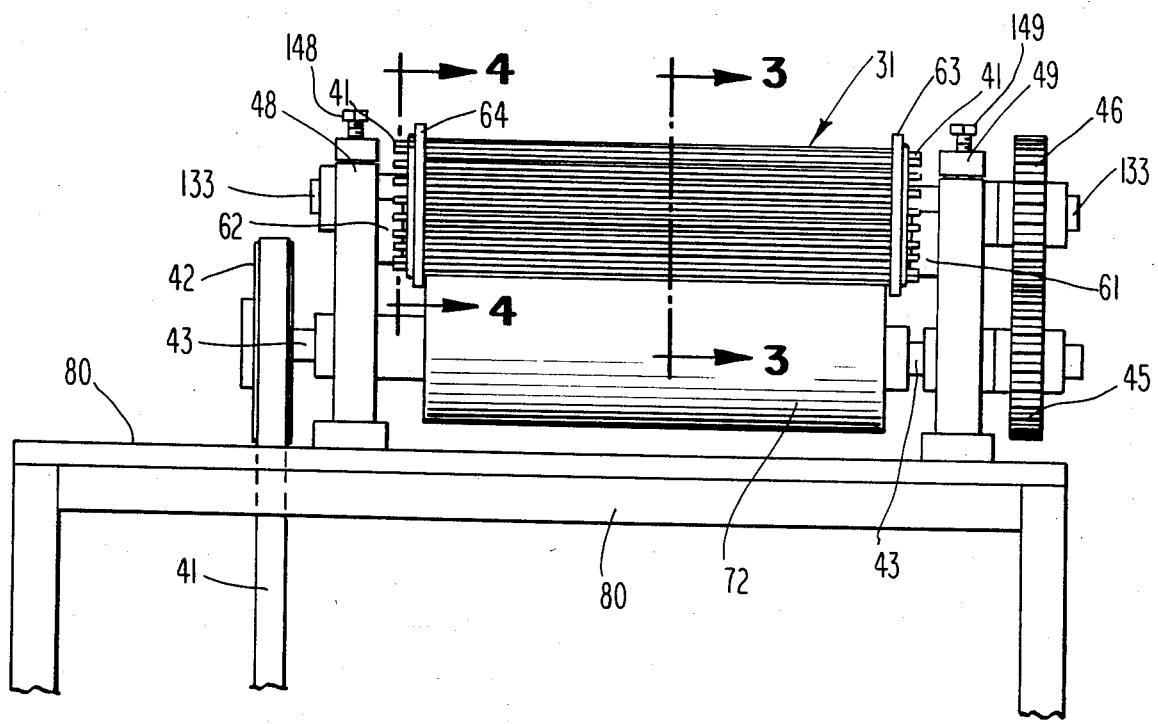
FIG. 2 is an end elevational view looking along the line 2—2 of FIG. 1.
Figure 3:
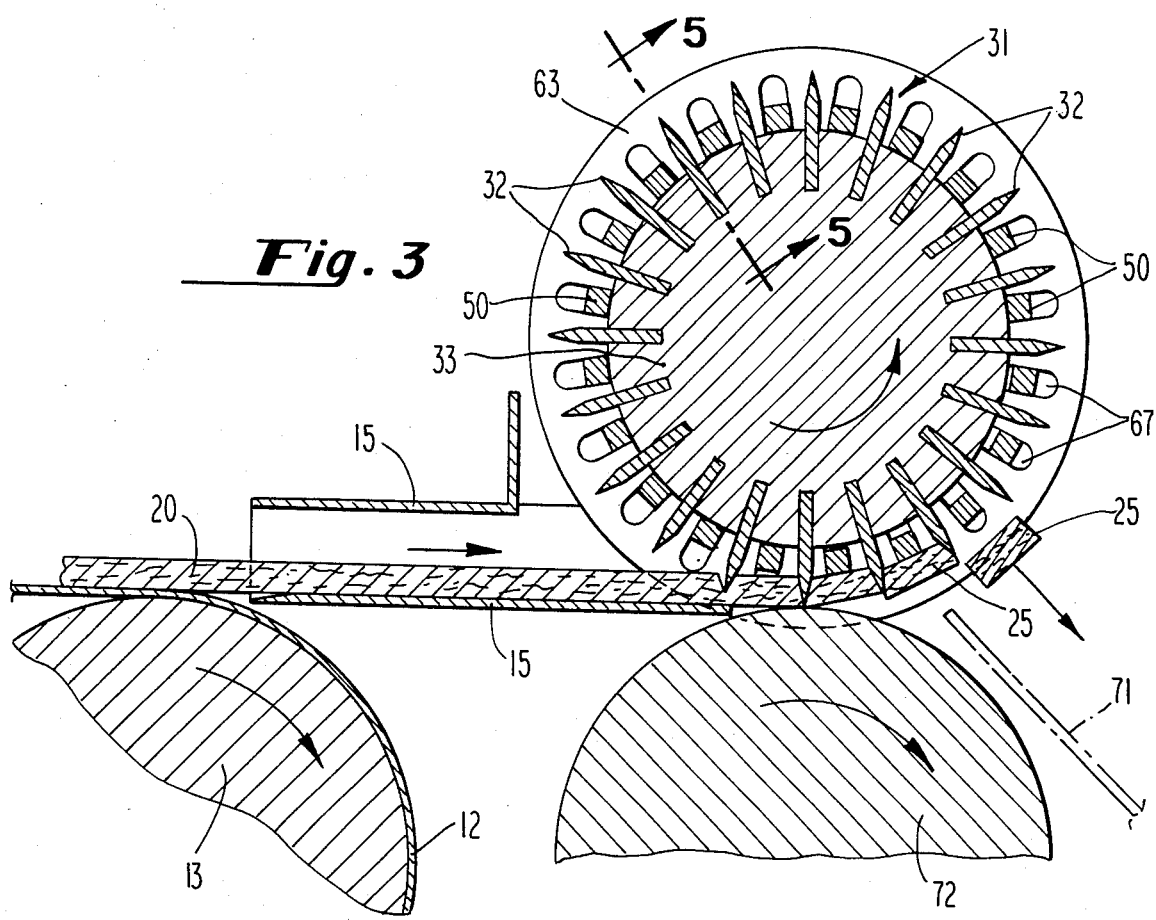
FIG. 3 is a side elevational view, largely in section, looking along the line 3—3 of FIG. 2.

As seen in FIG. 3, each of the plurality of radially-disposed cutter blades or knives 32 is inserted into a slot in a cutter roller 33 which has opposite ends 133 of reduced diameter journalled for rotation in pillow blocks 48, 49 (FIG. 2). Pillow blocks 48, 49 are vertically adjustable by bolts 148, 149. By adjusting these bolts, the knife assembly 31 is moved upwardly or downwardly relative to the fixed bottom roller 72, thereby to assure proper clearance between knives 32 and bottom roller 72.

Figure 4:
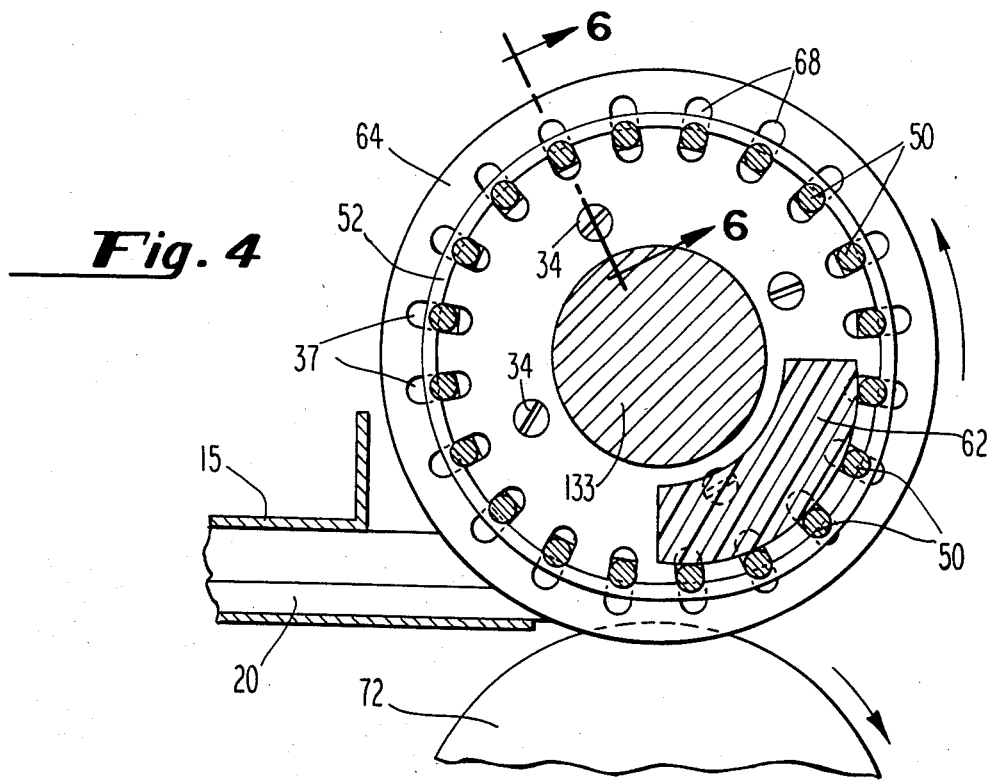
FIG. 4 is a side elevational view looking along the line 4—4 of FIG. 2.

In FIG. 5, each end of the knife blades 32 is shown to be provided with a projection, forming shoulders 35, 36 which abut against shoulders 65, 66 of circular end plates 63, 64, seen in FIGS. 3 and 4. This structural arrangement assures that the knife blades remain secured to the roller 33. As shown in FIG. 6, end plates 63, 64 are secured to the knife roller 33 as by means of screws 34.

In the particular cutter illustrated in the drawing and now being described, there are twenty knives radially disposed 18 degrees apart. The circumferential dimension of the circle defined by the cutting edges of the knives 32 is twenty inches. Thus, the spacing between each cutting edge is one inch.

Returning now to FIG. 6, each of the end plates 63, 64 is provided with a series of radial 67, 68. As seen best in FIG. 3, in each end plate one slot is located between each position of the radially-disposed knives 32. Inserted through each pair of opposing slots 67, 68 (FIG. 6) in end plates 63, 64 is a rod 50 which functions as an ejector rod. The circular array of rods 50 (FIG. 4) is retained at, or at least toward, the radially inward end of the slots 67, 68 by a pair of flexible belts 52, 53. The ejector rods 50 may preferably, although not necessarily, be formed of stainless steel and have a square cross-section except at each end 51 where, at the location of the retainer belts 52, 53, the cross-section of rod 50 is preferably circular.

Support means for a pair of cam plates 61, 62 (FIG. 4) are provided at table 80 at the cutting station 30. Such support means may preferably be arms projecting laterally inwardly from the pillow blocks 48, 49, for supporting inside the circular array of ejector rods 50, the cam plates 61, 62, one at each of the cutting roller. These cam plates 61, 62 are so positioned that as each rod 50 travels on its generally circular path, counterclockwise as viewed in FIG. 4, it comes into engagement with the camming surfaces of cam plates 61, 62 and is cammed radially outwardly in the restraining slots 67, 68, thereby coming into contact with the severed bites of licorice 25, and thereby ejecting the licorice bites from the cutter, as illustrated in FIG. 3. The licorice bites 25 then drop down onto an inclined surface 71 which leads to a collecting hopper or bin, not shown.

By the ejector means shown and described, the severed bites of licorice are prevented from becoming lodged between the blades of the cutter.

In a preferred embodiment, the knife-carrying roller is rotated at a speed such that the cutting edges of the knives move at a speed slightly greater than the speed at which the licorice strips are being conveyed by the conveyor into the cutter, thereby to assure that the licorice strips are "pulled" into the cutter and remain straight while cutting action is taking place. In this manner, the strips of licorice are reduced to bite size (1 inch) pieces by a combined cutting and straightening action.

We claim:

1. For use in licorice manufacturing equipment in which extruded licorice strips are to be reduced to bite length:
   a. a cylindrical roller mounted for rotation about its axis, said roller carrying a circular series of elongated knife blades projecting from said roller along radial lines and at equal angular spacings, the cuttin edge of each knife blade parallel to the rotational axis of said roller;
   b. a circular series of elongated ejector rods positioned parallel to and between said knife blades;
   c. a pair of end plates, one at each end of said roller, mounted concentrically with said roller for rotation therewith, each end plate being provided with radial slots receiving and supporting opposite ends of the said ejector rods, and allowing movement of said rods in said slots in the radial directions;
   d. resilient retaining means embracing said circular series of rods at opposite ends of said rods for retaining said rods in said slots on a circular diameter smaller than that defined by the outer ends of the series of slots; and
   e. a pair of camming surfaces one at each end of said knife-carrying roller and so positioned that, during rotation of said roller and end plates, said ejector rods come into engagement with said camming surfaces and are cammed radially outwardly, thereby to dislodge licorice bites from between adjacent cutting knives.

2. Apparatus according to claim 1 wherein said ejector rods are positioned outside the circumferential surface of said roller for radial movement in said slots.

3. Apparatus according to claim 2 wherein opposite ends of said ejector rods extend beyond said end plates, and said camming surfaces are mounted beyond the opposite ends of said roller and so positioned relative to the projected circumferential surface of said roller as to be engaged by the extended ends of said ejector rods.

4. Apparatus according to claim 3 wherein said knife-carrying roller is rotatable at such speed that each knife edge moves at a circumferential speed slightly greater than the speed at which elongated strips of licorice are conveyed to the cutter, thereby straightening and accurately forming licorice bites by a combined cutting and straightening action.

5. Apparatus according to claim 4 wherein the circumferential distance between adjacent knife edges is of the order to one inch for forming licorice bites having lengths of the order of one inch.

6. Apparatus according to claim 5 wherein said roller carries twenty cutter knives disposed radially at eighteen degrees spacing.

7. A cutter and ejector for severing tacky material, comprising:
   a. a cylindrical roller mounted for rotation about its axis, said roller carrying a circular series of elongated knife blades projecting from said roller along radial lines and at equal angular spacings, the cutting edge of each knife blade parallel to the rotational axis of said roller;
   b. a circular series of elongated ejector rods positioned parallel to and between said knife blades;
   c. a pair of end plates, one at each end of said roller, mounted concentrically with said roller for rotation therewith, each end plate being provided with radial slots receiving and supporting opposite ends of said ejector rods, and allowing movement of said rods in said slots in the radial directions;
   d. resilient retaining means embracing said circular series of rods at opposite ends of said rods for retaining said rods in said slots on a circular diameter smaller than that defined by the outer ends of the series of slots; and
   e. a pair of camming, surfaces one at each end of said knife-carrying roller and so positioned that, during rotation of said roller and end plates, said ejector rods come into engagement with said camming surfaces and are cammed radially outwardly, thereby to dislodge any severed material which has become lodged between adjacent cutting knives.

8. Apparatus according to claim 7 wherein said ejector rods are positioned outside the circumferential surface of said roller for radial movement in said slots.

9. Apparatus according to claim 8 wherein opposite ends of said ejector rods extend beyond said end plates, and wherein said camming surfaces are mounted beyond the opposite ends of said roller.

* * * * *

UNITED STATES PATENT AND TRADEMARK OFFICE
CERTIFICATE OF CORRECTION

PATENT NO. : 4,598,619
DATED : July 8, 1986
INVENTOR(S) : Lloyd C. Leeper; C. Thomas Mullen It is certified that error appears in the above-identified patent and that said Letters Patent is hereby corrected as shown below:

Column 1, line 17:

"arise" should be --anise--.

Column 2, line 28:

after "series of radial" insert --slots--.

Column 3, line 10:

"the cuttin" should be --the cutting--.

Column 3, line 19:

delete --the--.

Column 4, line 5:

after "order", "to" should be --of--.

Signed and Sealed this

Twenty-first Day of October, 1986

[SEAL]

Attest:

DONALD J. QUIGG

Attesting Officer

Commissioner of Patents and Trademarks